Oct. 17, 1944.   B. J. DAVIDSON   2,360,765
DISPENSING CARTON
Filed Jan. 11, 1943   2 Sheets-Sheet 1
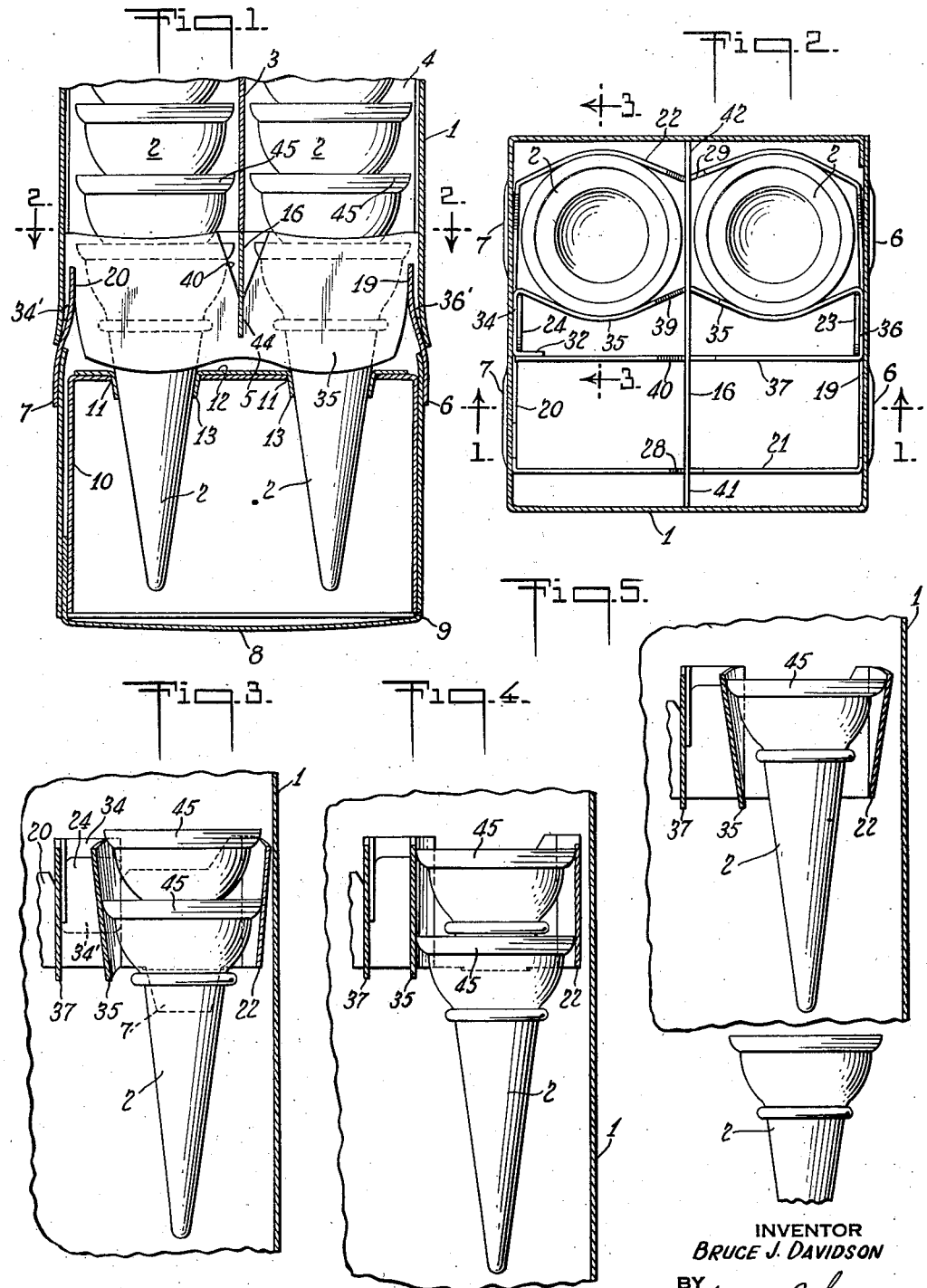
INVENTOR
BRUCE J. DAVIDSON
BY
Henry J Savage
ATTORNEY

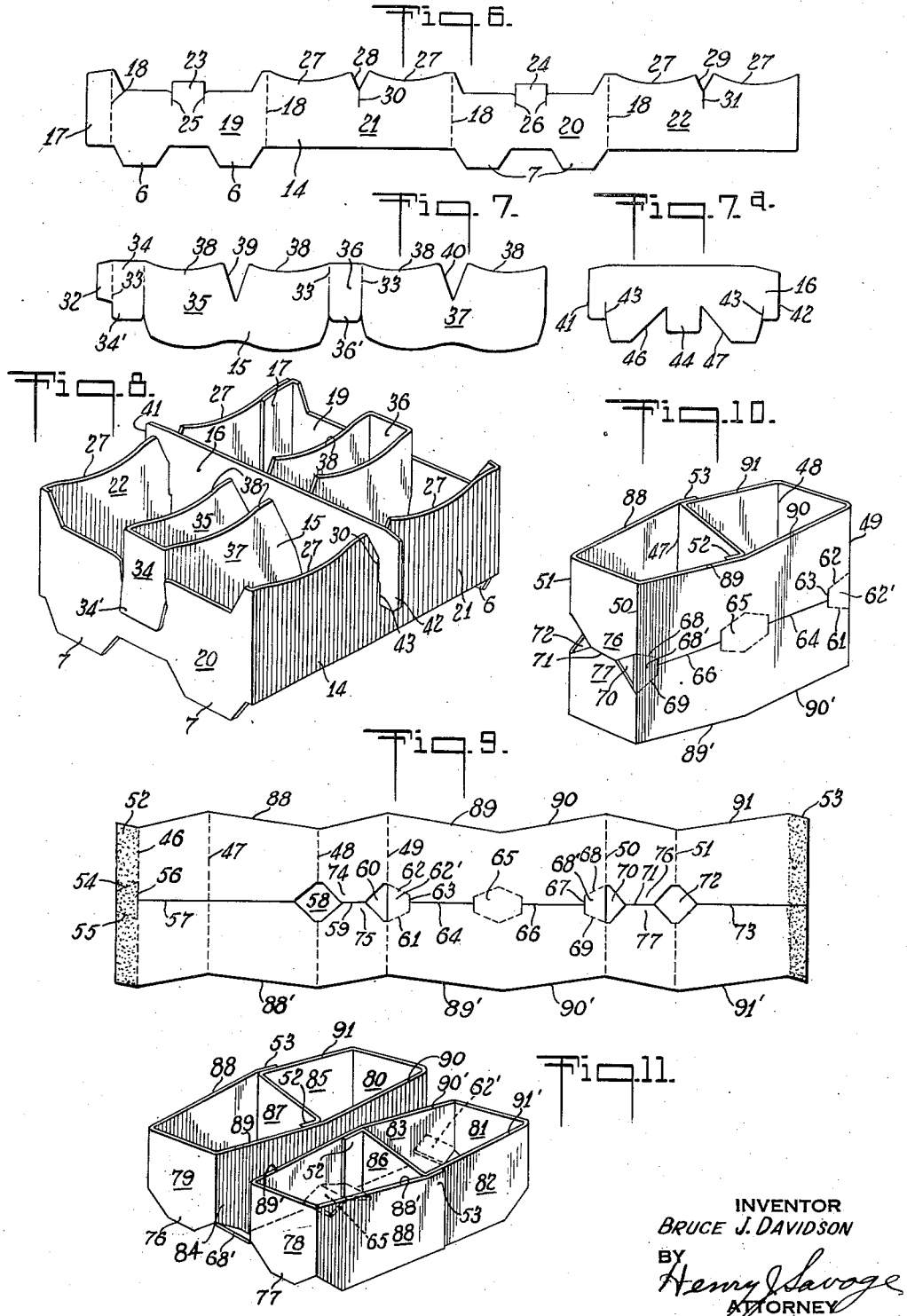

Patented Oct. 17, 1944

2,360,765

UNITED STATES PATENT OFFICE 2,360,765

DISPENSING CARTON

Bruce J. Davidson, Manhasset, N. Y., assignor to National Biscuit Company, New York, N. Y., a corporation of New Jersey Application January 11, 1943, Serial No. 472,060

12 Claims. (Cl. 206—56)

My invention pertains to dispensing cartons for ice cream cones and the like, and particularly to an improved dispensing unit that may be incorporated therein or used in a separate dispenser.

Recently ice cream cones and other pastry cups have been packaged in elongated cartons holding one hundred cones arranged in four stacks or sticks of twenty-five cones each. In one style or type of these cartons, the carton is inserted in a dispensing unit from which the cones are dispensed one at a time from the bottoms of the respective stacks. This requires the use of a separate dispensing unit. In another type of carton, the dispensing unit is made from cardboard and is built in as a part of the carton, so that a separate dispenser is not required.

The principal object of my invention is to improve the dispensing unit by making it cheaper, yet more reliable and certain in operation. This, and other objects and advantages are attained by my present invention, two embodiments of which I have selected for illustration in the accompanying drawings.

Fig. 1 is a section, taken substantially on the line 1—1 of Fig. 2, showing the lower end of a dispensing carton embodying one form of my invention and filled with ice cream cones.

Fig. 2 is a section taken substantially on the line 2—2 of Fig. 1, the two front stacks or sticks of cones being omitted.

Figs. 3, 4 and 5 are successive views showing how the cones are dispensed.

Figs. 6, 7 and 7A are plan views of the cardboard blanks for forming the outer frame, the inner frame, and spacer or brace of the dispensing unit.

Fig. 8 shows a dispensing unit formed from the blanks of Figs. 6, 7, 7A.

Fig. 9 is a blank for forming a single piece dispensing unit.

Fig. 10 shows the blank of Fig. 9, as it appears when the ends have been secured together by glueing.

Fig. 11 shows the one-piece dispensing unit formed from Figs. 9 and 10, ready to be secured in a carton.

In Fig. 1, 1 indicates an elongated carton adapted to hold four stacks of ice cream cones 2 which are separated by vertical partitions 3, 4. The lower cones of each stack are supported in a dispensing unit 5 which is secured in the lower end of the carton by means of tongues 6, 7 which extend through slits in opposite sides of the carton. The upper end of the carton, not illustrated, may be provided with means for hanging it up, similar to that shown in my copending application Ser. No. 399,801, filed June 26, 1941.

The bottom of the carton is closed by flap 8 which may be torn off along the line 9 when the carton is hung up so that the cones may be dispensed. A support or filler 10 has four round openings 11 through which the lower ends of the ice cream cones extend. In order to prevent the edges of the openings 11 from cutting into the ice cream cones I provide a cushion 12 which is made from soft paper and has a number of tongues 13 which project downwardly through the openings 11 and surround the stems of the cones so that the corners of the support will not damage them.

The dispensing unit shown in Fig. 1 is made from three pieces of cardboard, as shown in Figs. 6, 7, 7A and 8. The dispensing unit comprises an outer frame which is made from the single piece 14 shown in Fig. 6 and an inner frame 15 made from the single piece of Fig. 7. These frames are connected midway of their side walls by a brace or spacer 16, as shown in Fig. 7A.

Referring now to Fig. 6, the piece of cardboard for forming the outer frame has a glue flap 17 at one end which is adapted to be glued to the opposite end to form the frame, the piece being scored along the lines 18 so that it can be folded into rectangular shape. These score lines divide the strip into two end panels 19, 20 and two side panels 21, 22, the side panels 21, 22 being substantially the same length as one dimension of the carton, and the end panels 19, 20 being shorter, so that when the unit is assembled in the carton the walls 21, 22 will be spaced from the adjacent walls of the carton. At the lower edges of the walls, 19, 20 are tongues 6, 7 which extend through slits in two of the carton walls so as to support the dispensing unit. On their upper edges the walls 19, 20 are provided with tongues 23, 24 and short cuts or slits 25, 26 for supporting the inner frame 15. The top edges of the side walls 21, 22 are higher than the tops of the end walls and are curved or inclined, as indicated at 27, so as to present a sloping edge to the tops of the ice cream cones. At the center of each of the top edges of the side walls there is provided a notch 28, 29 below which a short slit 30, 31 continues.

The inner frame 15 has a glue flap 32 at one end which is adapted to be glued to the opposite end and the piece is folded on the score lines 33 to form a rectangular frame which is relatively narrow. These score lines divide the frame into four panels 34, 35, 36 and 37. The lower ends of the panels 34, 36 are extended to provide tongues 34', 36' which cooperate with the tongues 23, 24 and slits in the tops of the end walls of the outer frame to support the inner frame, as is shown in Fig. 8. The panels 34, 36 are substantially the same width as the tongues 23, 24 so that these tongues provide a close fit within the inner frame. The tops of the side walls 35, 37 are curved or inclined, as shown at 38, in the same manner as is shown at 27 for the side walls of the outer frame. Midway of their ends the walls 35, 37 are provided with notches 39, 40, which, when the two frames are assembled, fall in alignment with the notches 28, 29.

The spacer or cross-wall 16 is somewhat longer than the end walls 19, 20, so that when the unit is assembled, the ends project beyond the side walls 22, 19, and contact the side walls of the carton, as shown in Fig. 2. These projecting ends 41, 42 space the walls 21, 22 from the carton walls so that the walls 21, 22 may bow out to permit the passage of a cone, as shown in Fig. 2.

The spacer 16 has two slits 43, 43 which fit down into the slits 30, 31 at the bottom of the notches 28, 29 and midway of its two ends has a tongue 44 which fits between and engages the two walls 35, 37 of the inner frame. The tongue 44 is between two triangular notches 46, 47, the apices of which engage or rest upon the points of the notches 39, 40.

The dispensing unit, when assembled as shown in Fig. 8, is inserted in the bottom of the carton with the tongues 6, 6, and 7, 7 engaging in corresponding slits in two opposite sides of the carton.

As shown in Figs. 2 and 8, this unit provides four dispensing passages for the ice cream cones, each of which is formed by two vertical, flexible walls. The projecting ends 41, 42 of the spacer hold the walls 21, 22 spaced away from the two side walls of the carton, so that they can bow outward, as best shown in Fig. 2.

One passageway for the cones is formed between the two walls 22, 35 and between the wall 20 and spacer 16. A second passageway is formed between the walls 35 and 22 and between the spacer 16 and wall 19. A third passageway is formed between the walls 21 and 37 and between the spacer 16 and the wall 19. A fourth passageway is formed between the walls 21 and 37 and between the spacer 16 and wall 20. Normally these passages are rectangular, as shown in the lower half of Fig. 2, but when the ice cream cones are pulled down between the two walls of the dispenser they are bowed out, as shown in the upper half of this figure.

As shown in Figs. 1, 3 and 4, the height of the side walls 12, 22, 35, and 37 is greater than the distance which one of the ice cream cones projects above another into which it is nested, but this height may be more or less than illustrated, depending upon the springiness of the material. But relatively deep walls facilitate the pulling down of the cones, and assure a gentle gripping action on them. Each ice cream cone or other pastry cup is largest at the top where it is strengthened by a reinforced bead 45. As shown in Figs. 1 and 3, the top of the bottom cone of a stack normally is slightly below the top edge of the side walls of the dispensing unit so that the tops of these walls are bowed out slightly as shown in Fig. 5 and this bowing out of the top draws in the bottoms slightly, as shown in the same figure.

When a cone is to be withdrawn from the dispenser, the bottom one occupies a position substantially as shown in Figs. 1 and 5. As the cone is drawn down, the stack follows it, with the walls of the dispenser expanding slightly, as shown in Fig. 3, wherein the top of the bottom cone is just about at or perhaps slightly above the center of the side walls. As the bottom cone is pulled down still further, the lower edges of the wall expand outward and the next cone follows down so that its bead 45 enters between the side walls 22, 35 and at this time the side walls are substantially parallel throughout their height, as shown in Fig. 4, although bowed out, as shown in Fig. 2. At this point, the tops of the side walls have gripped the bead 45 of the upper cone and will hold it and the stack above it, while the lower cone is removed as shown in Fig. 5. When the lower cone is pulled from the dispenser, as shown in this figure, the lower edges of the side walls spring inwardly, as illustrated, so that the dispenser is ready to dispense the next cone.

The tops of the side walls are cut away or inclined at the top, as shown at 27 and 38, so that the bead 45 will not encounter a horizontal edge but will gradually force the side walls out and enter between them without breaking or shearing off the edges of the bead.

It will be noted on reference to Fig. 7, that the lower edges of the frame member 15 are rounded or cut away, the same as the top edges at 38, but this is only for convenience in manufacture in cutting these blanks out from a large piece of cardboard, the convexly curved edges at one side of one blank fitting into the concave edges on the opposite side of the next blank, so that there is no waste of material.

In Figs. 9, 10, and 11, I have shown another form of my invention in which the dispensing unit is made from a single piece of cardboard. The single piece of cardboard is scored along the lines 46, 47, 48, 49, 50 and 51 so that it can be folded into the form shown in Fig. 10 with the glue strip 52 secured midway of one side wall and the glue strip 53 secured to an opposite side wall adjacent the score line 47. The blank of Fig. 9 is cut and scored near the center so that after it has been assembled, as shown in Fig. 10, the upper half can be turned along certain of these score lines so as to provide the dispensing unit as shown in Fig. 11. Beginning at the left of Fig. 9 there are two short, inclined score lines 54, 55 which end at a vertical cut 56 which coincides with the score line 46. From the line 56, a cut 57 extends to a diamond shaped opening 58 from which a second cut line 59 extends to a triangular opening 60, the base of which coincides with the score line 49. From the line 49 two diagonal score lines 61, 62 extend to a short, vertical cut 63 from which a horizontal cut line 64 extends to a small hexagon 65 which is bounded on four sides by score lines and on two sides by short, vertical cuts. From the hexagon a horizontal cut 66 extends to a short, vertical cut 67 from the end of which two diagonal score lines 68, 69 extend to the score line 50. A small triangle 70 is cut out at this point and from it a short cut 71 extends to a diamond shaped opening 72 which is centrally disposed with respect to the score line 51. From the opening 72, a cut line 73 extends to the end of the blank. When the blank is folded and the ends secured, as shown in Fig. 10, the lower half will be turned up about the line 64, 66, and the hexagon 65, together with the two small trapezoids 62' and 68', bounded by the score lines 61, 62, and 68, 69, will serve as hinges or tongues to connect the two parts together and space the inner walls apart, as clearly shown in Fig. 11.

When the glue strip 52 is secured in place, the score lines 54, 55 coincide with two of the sides of the hexagon 65, and the cut line 56 falls upon the vertical diameter of the hexagon. When the two parts are turned to operative position, as shown in Fig. 11, the trapezoidal tongues 62', 68' assume inclined positions connecting the lower edges of the walls 83, 84 at their ends, and the hexagon 65 flexes or bends along a diameter to form a tongue that connects the lower edges of walls 85, 84 midway between the ends.

Between the openings 58, 60 and 70, 72, tongues 74, 75, 76, 77 are formed which are adapted to be received in slits in the carton to hold the dispensing unit in the same manner as the tongues 6 and 7 hold the dispenser in Fig. 1. As shown in Fig. 11, when the unit is assembled the cut and score lines form the end walls 78, 79, 80, 81, and the four side walls, 82, 83, 84 and 85 which correspond in function with the end walls 19, 20 and the side walls 21, 37, 35 and 22 in Fig. 8. The length of the side walls 82, 83, 84, 85 is substantially equal to one dimension of the carton but the distance from one outside wall 82 to the opposite outside wall 85 is less than the width of the carton so that these outer walls 82, 85 will be spaced from the carton side walls, the same as the walls 21, 22 as shown in Fig. 2. The side walls 82, 83 are connected midway of their length by the brace or spacer 86 and similarly 84, 85 are connected by the brace or spacer 87 so that the unit provides four passageways for ice cream cones, the same as the unit of Fig. 8. These vertical side walls 82, 83, 84, 85 function in the same manner as the side walls of the dispenser of Fig. 8.

As shown in Fig. 9, the top edges of these side walls are cut on either curved or straight diagonal lines 88, 89, 90, 91 and on the bottom edges along similarly inclined lines 88', 89', 90' and 91'. These diagonal lines form the top edges of the unit and present sloping edges to the cones which serve the same function as the curved lines 27, 38 of Fig. 8 and may be straight as shown or curved as in Fig. 8. It will be noted from Figs. 9 and 11, that the top edges of opposed walls, as 88, 89 for example, slope in opposite directions. Thus edge 88 slopes down away from brace 87, while edge 89 slopes down toward the brace.

Another important advantage of my dispenser is that the cones are contacted by or held by only the flat surfaces of the walls, so that there is no cutting or breaking of the tops of the cones as in other dispensers wherein inwardly projecting fingers or lugs often cut or break the tops of the cones. Another advantage is that I do not need to use resilient bands or springs to urge the side walls into engagement with the cones, but the resilience of the material of the walls is sufficient to perform the function.

While I have described the dispensing unit as being made from cardboard, it may be made from more durable material, as hard fibre board or thin sheet metal, when more durable or permanent dispensers are desired. The cardboard dispenser is cheap and sufficiently durable to dispense the hundred cones packed in a carton, after which it and the empty carton are thrown away. But when my invention is to be embodied in a permanent fixture, that will be used on a large number of cartons, then the side walls, as well as other parts may be made of thin, flexible, yet durable, material.

While I have shown and described my invention as being embodied in a unit adapted to dispense four stacks of cones, cups, or other articles, it may be used to dispense one, two or any multiple of stacks.

Having thus described my invention, what I claim is:

1. A dispensing unit of rectangular outline adapted to be secured within a rectangular carton, said unit having two parallel outer side walls and two inner walls spaced apart and parallel to and spaced from the outer walls a distance less than the diameter of the articles to be dispensed therethrough, said inner and outer walls being vertical and secured at their ends to vertical end walls, spacers securing the inner and outer walls against spreading midway of their ends, whereby said four parallel side walls provide four passageways for the articles to be dispensed, the side walls of said passageways being yieldable outward between said end walls and spacers to permit an article to enter therebetween, the height of the inner and outer side walls being greater than the distance between the tops of two nested articles that are to be dispensed successively.

2. A dispensing unit of rectangular outline adapted to be secured within a rectangular carton, said unit having two parallel outer side walls and two inner walls spaced apart and parallel to and spaced from the outer walls a distance less than the diameter of the articles to be dispensed therethrough, said inner and outer walls being vertical and secured at their ends to vertical end walls, spacers securing the inner and outer walls against spreading midway of their ends, whereby said four parallel side walls provide four passageways for the articles to be dispensed, the side walls of said passageways being yieldable outward between said end walls and spacers to permit an article to enter therebetween, the height of the inner and outer side walls being greater than the distance between the tops of two nested articles that are to be dispensed successively, the top edges of said inner and outer walls being inclined with respect to the tops of the articles to be dispensed.

3. A dispensing unit for dispensing ice cream cones and the like one at a time from the bottom of a stack, comprising two parallel flexible walls spaced apart less than the maximum diameter of the cones, and between which the cones must pass, said walls being secured together at their ends so that the walls may bow outwardly to permit the passage of a cone therebetween, the height of the walls being greater than the distance that one cone projects from another when nested therein, the tops of the walls yielding outwardly and the lower edges of the walls converging as the lower cone of the stack is pulled therebetween, and the tops of the walls closing inward as the top of the lower cone approaches the lower edges of the walls and forces the latter outward, whereby the top of the next following cone is gripped and held by the top portions of the walls when the lower cone is removed.

4. A dispensing unit for dispensing ice cream cones and the like, one at a time, from the bottom of a stack, comprising two parallel flexible walls spaced apart less than the maximum diameter of the cones and between which the cones pass when dispensed, the tops of the walls bowing outwardly to admit the top edge of a cone therebetween and the lower edges of the walls converging when the lower cone of the stack is pulled downward, the tops of the walls again converging and the lower edges diverging when the top of the cone passes below the mid-point thereof, whereby the tops of the walls will close upon and hold the next following cone as the lower cone is pulled free from the walls.

5. A dispensing unit for dispensing ice cream cones and the like, one at a time, from the bottom of a stack, comprising two parallel flexible walls spaced apart less than the maximum diameter of the cones and between which the cones pass when dispensed, the tops of the walls bowing outwardly to admit the top edge of a cone therebetween and the lower edges of the walls converging when the lower cone of the stack is pulled downward, the tops of the walls again converging and the lower edges diverging when the top of the cone passes below the mid-point thereof, whereby the tops of the walls will close upon and hold the next following cone as the lower cone is pulled free from the walls, the top edges of the flexible walls being inclined with respect to the tops of the cones.

6. A dispensing unit for ice cream cones and the like, comprising an outer rectangular frame having two side walls and two end walls, said end walls having means for securing the dispenser within a carton, a narrow inner rectangular frame having two side walls and two end walls, the end walls of said inner frame interlocking with the end walls of said outer frame midway of their length whereby each of the side walls of the inner frame is spaced from one of the side walls of the outer frame a distance less than the diameter of the cones to be dispensed, and a spacer interlocking with said four side walls midway of their lengths and holding them in spaced apart relation.

7. A dispensing unit for ice cream cones and the like, comprising an outer rectangular frame having two side walls and two end walls, said end walls having means for securing the dispenser within a carton, a narrow inner rectangular frame having two side walls and two end walls, the end walls of said inner frame interlocking with the end walls of said outer frame midway of their length whereby each of the side walls of the inner frame is spaced from one of the side walls of the outer frame a distance less than the diameter of the cones to be dispensed, and a spacer interlocking with said four side walls midway of their length and holding them in spaced apart relation, said spacer extending at each end beyond the outer frame side walls.

8. A dispenser for ice cream cones and the like having two parallel outer side walls and two inner walls spaced apart and parallel to and spaced from the outer walls a distance less than the diameter of the articles to be dispensed therethrough, said inner and outer walls being vertical and secured at their ends to vertical end walls, spacers securing the inner and outer walls against spreading midway of their ends, whereby said four parallel side walls provide four passageways for the articles to be dispensed, the side walls of said passageways being yieldable outward between said end walls and spacers to permit an article to enter therebetween.

9. A dispensing unit for ice cream cones and the like formed from a single piece of flexible material that is cut, scored, folded and glued to form two outer vertical side walls and two inner vertical side walls, the inner side walls being closely adjacent and connected at their lower edges by tongues, the inner walls being spaced from the respective outer walls less than the diameter of the articles to be dispensed, a spacer connecting each outer wall to an inner wall substantially midway of their lengths, and end walls connecting the ends of the outer walls to the ends of the inner walls, whereby the outer and inner side walls may be bowed apart between said end walls and spacers to permit an article to be dispensed.

10. A dispensing unit for pastry cups and the like formed from a single piece of flexible material that is cut, scored, folded and glued to form two similar rectangular frames spaced apart and having their adjacent side walls connected by tongues at the ends and center of their lower edges, a spacer connecting the side walls of each frame substantially midway of their lengths and dividing each frame into two passageways for the pastry cups.

11. A rectangular dispensing unit for four stacks of pastry cups and the like, said unit having end walls provided with means for securing the unit within a carton, said unit having two outer and two inner parallel flexible side walls, said inner walls being spaced apart, the distance between each outer side wall and its adjacent inner side wall being less than the maximum diameter of the cups to be dispensed and the length of said side walls being greater than twice said diameter, and means connecting each outer side wall to its adjacent inner side wall substantially midway of their lengths whereby each outer and inner wall provides two passageways for the cups.

12. A dispenser for ice cream cones comprising a rectangular carton, a rectangular dispensing unit having two end walls and two side walls within the carton, the end walls being secured to two opposite side walls of the carton adjacent its lower end and being shorter than the width of said carton walls, the side walls of the unit being substantially equal in length to the width of the other two side walls of the carton and spaced inwardly therefrom, whereby said unit side walls may be sprung outwardly toward the carton walls to increase the width of the space between them.

BRUCE J. DAVIDSON.